United States Patent [19]

Sowada

[11] Patent Number: 5,698,957
[45] Date of Patent: Dec. 16, 1997

[54] OVER CURRENT PROTECTIVE CIRCUIT WITH TIME DELAY FOR A FLOOR CLEANING MACHINE

[75] Inventor: Mark J. Sowada, Eagan, Minn.

[73] Assignee: Advance Machine Company, Plymouth, Minn.

[21] Appl. No.: 427,200

[22] Filed: Apr. 24, 1995

[51] Int. Cl.$^6$ ........................................................ H02P 7/00
[52] U.S. Cl. ............................................... 318/434; 361/31
[58] Field of Search ........................... 318/434, 101–104; 361/23, 65, 29, 31, 42–50; 307/9, 41

[56] References Cited

U.S. PATENT DOCUMENTS

| | | |
|---|---|---|
| 3,424,964 | 1/1969 | Bacon . |
| 3,426,259 | 2/1969 | Ziehm . |
| 3,599,006 | 8/1971 | Harris ........................... 307/116 |
| 3,668,485 | 6/1972 | Norris ........................... 318/12 |
| 3,784,846 | 1/1974 | Krick et al. . |
| 3,875,487 | 4/1975 | White ........................... 318/487 |
| 4,100,466 | 7/1978 | Schroeder ........................... 318/102 |
| 4,196,462 | 4/1980 | Pohl . |
| 4,590,635 | 5/1986 | Tucker et al. . |
| 4,633,541 | 1/1987 | Block . |
| 4,652,802 | 3/1987 | Johnston ........................... 318/103 X |
| 4,667,364 | 5/1987 | Meili . |
| 4,675,935 | 6/1987 | Kasper et al. . |
| 4,679,271 | 7/1987 | Field et al. . |
| 4,736,116 | 4/1988 | Pavlak, Jr. et al. . |
| 4,879,623 | 11/1989 | Baumgartner et al. . |
| 4,906,857 | 3/1990 | Cummis et al. . |
| 5,355,059 | 10/1994 | McMillan ........................... 318/103 |
| 5,448,442 | 9/1995 | Farag ........................... 361/25 X |

*Primary Examiner*—Jonathan Wysocki

[57] ABSTRACT

A protective circuit controls the operation of a floor cleaning machine provided with a brush motor and a vacuum motor. The protective circuit disables the vacuum motor when an operator starts the brush motor and then restarts the vacuum motor provided it was previously running. The floor cleaning machine is also provided with provisions for adjusting the action of the brush and thus changing the load current of the brush motor. The load current of the brush motor is continuously compared to a first level overload current and an indicator alerts the operator to a first level overload condition allowing a predetermined time for the load current to be reduced by adjusting the brush. If the load current is not reduced, then the brush motor is de-energized. If a second level overload condition of the brush motor occurs at any time, the brush motor is de-energized immediately.

20 Claims, 1 Drawing Sheet

OVER CURRENT PROTECTIVE CIRCUIT WITH TIME DELAY FOR A FLOOR CLEANING MACHINE

BACKGROUND OF THE INVENTION

The present invention relates generally to motor control circuits and particularly to protective motor control circuits for controlling the starting and operation of two motors where an operator may manually adjust the load of one of the motors.

A floor cleaning machine such as a carpet extractor for cleaning large floor areas as in hotels, offices and the like will typically include two motors. A first motor, sometimes referred to as a brush motor, is coupled to a rotating agitator containing brushes which contact the surface to be cleaned. A second motor, sometimes referred to as a vacuum motor, is coupled to an air moving device for creating directional air flow at the brushes or pads so as to remove debris from the surface being cleaned.

Floor cleaning machines are necessarily portable devices which typically receive their electrical energy from alternating current receptacles located at intervals throughout a building. The distances separating AC receptacle locations varies with the age and the type of building. In addition, carpet machines are typically designed for use with one or the other of 115 volt or 230 volt receptacles. Consequently, a carpet cleaning machine is typically furnished with a fairly lengthy power cord or cable. The size of the conductors is determined by load current requirements of the floor cleaning machine and regulations, e.g., the National Electrical Code. It is common for the vacuum motor of a floor cleaning machine to draw 10 or 11 amperes at its steady state running condition. In the past, it was not uncommon for the brush motor of a carpet extractor to remain in the locked rotor condition after the motor was energized, because the vacuum motor was already running. With the amount of current required by the vacuum motor flowing in the power cord, the voltage drop in the power cord is high enough that the nominal AC supply voltage available at the receptacle is reduced until it is too low to provide sufficient power to start the brush motor.

In addition, floor cleaning machines typically provide for an operator to adjust the action of the brushes by moving the rotating brushes toward or away from the surface being cleaned. This movement of the brushes increases the brush motor load as the brushes are moved toward the surface and reduces the load as the brushes are moved away from the surface. In the past, this has resulted in brush motors operating in an overload condition for an extended period of time. This type of operation results in higher motor temperatures and shortened motor life.

Thus, a need exists for a protective control circuit that assures that the maximum power available may be used to start the brush motor; that provides an indication to the operator when the brush motor is operating in a first level overload condition, giving the operator a period of time to adjust the operating load; and that de-energizes the brush motor immediately when a second level overload condition occurs.

SUMMARY OF THE INVENTION

The present invention solves these and other needs in the field of floor cleaning machines by providing a protective circuit for controlling the operation of the floor cleaning machine provided with a brush motor and a vacuum motor. The brush motor has a greater starting current than the vacuum motor, and the floor cleaning machine has a provision for adjusting the brushes which affects the load current. In a first aspect, the protective circuit disables the vacuum motor when an operator starts the brush motor and then restarts the vacuum motor provided it was previously running.

In another aspect of the present invention, the load current of the brush motor is continuously compared to a first level overload current and an indicator alerts the operator to a first level overload condition allowing a predetermined time for the load current to be reduced. If the load is not reduced, the brush motor is de-energized. If a second level overload condition occurs, the brush motor is de-energized.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DESCRIPTION

Figure 1:
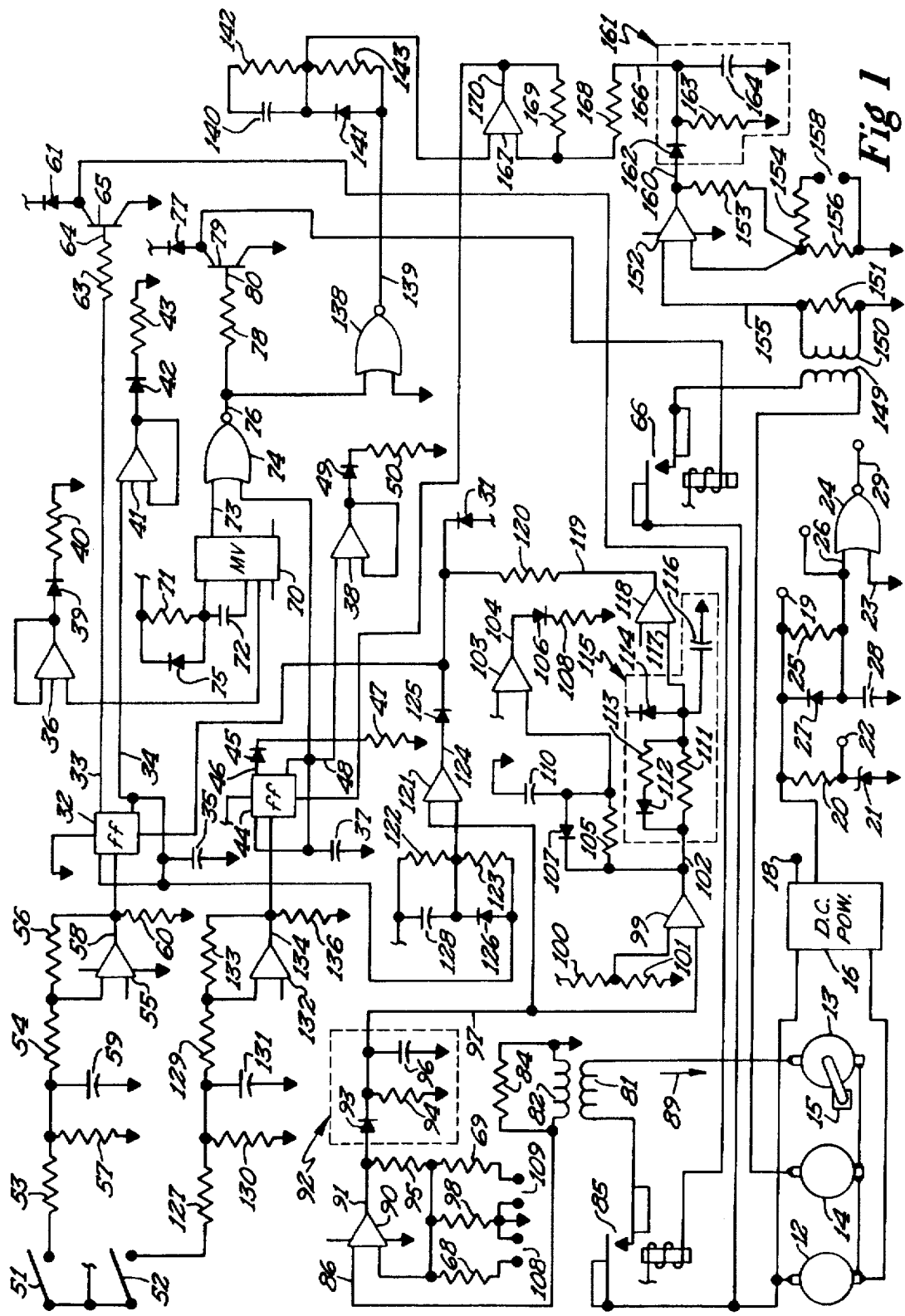
FIG. 1 shows a schematic drawing of a protective control circuit for a floor cleaning machine according to the preferred teachings of the present invention.

A circuit for controlling the operation of a first motor and a second motor according to the preferred teachings of the present invention is shown in the drawings. A conventional alternating current (AC) voltage source 12 such as the usual 115 or 230 volt, 60 hertz, commercial utility source supplies power to operate motor 13 and motor 14 as hereinafter explained. In the preferred embodiment shown, motor 13, referred to as a brush motor, is coupled to an agitating means or brush 15. Motor 14 is coupled to a means such as a fan for creating directional air flow at the agitating means and is referred to as a vacuum motor. Motor 13 and motor 14 would typically be found in a floor cleaning machine.

Voltage source 12 also supplies DC power supply 16 which provides unregulated 24 volt DC at 18 as provided for example by a transformer having a center tap secondary and driving two diodes. The unregulated 24 volt DC can be provided as an input to a regulated power supply with filter capacitors at its output to provide regulated 12 volt DC at 19. The regulated DC feeds resistor 20 and zener diode 21 to provide a 6 volt reference at 22.

When AC power source 12 is applied to DC power supply 16, a power on clear sequence (POC) is provided as follows. Input 23 to NOR gate 24 is low and input 26 is initially low due to the charging of capacitor 28 through resistor 25. Therefore, output 29 of NOR gate 24 is initially high. Initially, high output 29 or POC_N is applied through diode 31 to reset input (R) of flip-flop 32 causing Q output 33 to be low and Q-bar output 34 to be high and red led 42 to be on. Op-amp 36 is connected with its output connected to its minus input so that its output will be linearly proportional to the input at its plus terminal and will drive led 39 through resistor 40. Q-bar output 34 of flip-flop 32 is connected to the plus terminal of op-amp 41 which drives led 42 through resistor 43. When AC power is applied at DC power supply 16, the initially high output POC_N of NOR gate 24 is applied at the S input of flip-flop 44 and the R input is low so that Q will be high and Q bar will be low. Resistor 47 and led 45 are connected to the Q output. When capacitor 28 is charged, output 29 of NOR gate 24 goes low and no longer functions in the circuit. The Q output 46 is connected to led 45 and will drive led 45 through resistor 47 indicating that vacuum motor 14 is on. Led 42 will then be on indicating brush motor 13 is off. Diode 27 provides a discharge path for capacitor 28 when power is removed from the circuit.

Switch 51 controls operation of motor 13 and switch 52 controls operation of motor 14 as described herein. Switch 51 and switch 52 are of the momentary type and are only closed as long as an operator is physically pressing the switch.

The control of brush motor 13 will be explained first. When switch 51 is depressed, 12 volts DC is applied through a network of resistor 53, resistor 54, resistor 57, and capacitor 59 to the positive terminal of op-amp 55, which has a 6 volt DC signal connected to its negative terminal. Op-amp 55 is connected as a comparator having a feedback resistor 56 connected between output 58 and its positive input, so that with 12 volts present at its positive input terminal, output 58 will be 12 volts or high. Output 58 is applied to the CLK input of flip-flop 32 causing Q to change state (low to high or high to low). Output 33 of flip-flop 32 is applied through resistor 63 to base 64 of NPN transistor 65 causing it to conduct and to pull in relay 85 which applies AC power source 12 to motor 13 causing it to start. Transistor 65 has diode 61 connected between 24 volt DC and transistor 65 for discharging the energy stored in the coil of relay 66 when transistor 65 is turned off. It functions to protect transistor 65 from voltage spikes. Output 33 of flip-flop 32 is also applied to the plus input of op-amp 36 causing led 39 to be energized indicating motor 13 is running.

In the event that motor 14 was running at the time that switch 51 was manually depressed, then according to the teachings of the present invention, motor 14 is momentarily de-energized to provide maximum starting power to motor 13. This feature will now be explained. Output 33 of flip-flop 32 is also applied to the +T input of component 70. Component 70 is a monostable multivibrator or one shot which maintains the same state of Q low and Q bar high until it is triggered at its +T input, then Q goes high and Q bar goes low for a period of time determined by resistor 71 and capacitor 72 connected at the RC and CX terminals of one shot 70. Diode 75 is for protection of component 70. Q output 73 of one shot 70 is connected to one input of NOR gate 74 and Q-bar output 48 of flip-flop 44 is connected to the second input. Output 48 is low when vacuum motor 14 is running. A high Q output 73 from one shot 70 serves as a vacuum disable signal and causes output 76 of NOR gate 74 to go low and applies output 76 through resistor 78 to base 80 of NPN transistor 79 which causes transistor 79 to stop conducting and de-energizes relay 66 removing AC power from motor 14. This period of time, as determined by resistor 71 and capacitor 72, is to allow motor 13 to obtain maximum starting power from the AC voltage source 12. Diode 75 is to protect one shot 70. After the time period determined by resistor 71 and capacitor 72 has elapsed, then Q output 73 of one shot 70 will again go low and output 48 of flip-flop 44 continues to be low which causes output 76 of NOR gate 74 to go high. A high output 76 causes NPN transistor 79 to conduct which energizes relay 66 causing motor 14 to start. Diode 77 functions as was previously explained for transistor 64.

An additional feature of the present invention will now be explained. A transformer is provided including primary 81 and secondary 82. Primary 81 is connected in series with the contacts of relay 85 and motor 13 and thus carries the load current 89 of motor 13. Secondary 82 is connected to load resistor 84 which provides an output 86 which is proportional to or representative of the load current 89 of motor 13.

Output 86 is applied to the positive input of op-amp 90 which has feedback resistor 95. Resistor 98 is connected between the minus input and ground. The gain of op-amp 90 may be programmed by introducing or not introducing resistor 68 and resistor 69 by shorting at terminals 108 and 109.

In this way the gain can be adjusted for different values of AC voltage source 12, e.g., 120 volt or 230 volt, or for different motors, for example ¼ HP or ⅓ HP. Output 91 of amplifier 90 is applied to peak detection circuit 92 comprising diode 93, resistor 94 and capacitor 96 and providing a peak value output signal at 97. Output 97 is applied to both a timed overload cutout circuit and to a locked rotor cutout circuit for brush motor 13.

The timed overload cutout circuit may be explained as follows. Op-amp 99, resistor 100, and resistor 101 comprise a comparator. Resistor 100 and resistor 101 establish a voltage level of approximately 4.8 volts at the negative input of op-amp 99. If signal 97 is below 4.8 volts, then output 102 of op-amp 99 is low. Output 102 is applied through a network of resistor 105, diode 107 and capacitor 110 to the positive input of op-amp 103. Output 104 of op-amp 103 is connected to led 106 and resistor 108. When output 102 is low, then output 104 is also low and led 106 is off and motor 13 is operating within its normal range of load current. When output 104 is high, then led 106 is on indicating that the brush current is too high and provides a warning to an operator of a first level overload condition.

Output 102 is also applied through a timing circuit 115 to the positive input of op-amp 118. Timing circuit 115 includes resistor 111, diode 112, resistor 113, diode 114 and capacitor 116. When a first level overload condition occurs, i.e. when output 102 goes high, capacitor 116 will begin charging through resistor 111. If the voltage on capacitor 116 reaches 6 volts, then output 117 of timing circuit 115 will cause output 119 of op-amp 118 to go high. Output 119 is applied through resistor 120 to the R input of flip-flop 32 and motor 13 is turned off as described in the power on clear sequence described hereinbefore.

The locked rotor cut out circuit or second level overload condition for brush motor 13 can be explained as follows. Output 97 of peak detector circuit 92 is also applied to the positive input of op-amp 121. Resistor 122 and resistor 123 establish a voltage of approximately 9.8 volts at the negative input of op-amp 121. During normal operation, if output 97 is below 9.8 volts, then the output 124 of op-amp 121 remains low. If output 97 exceeds 9.8 volts, then output 124 of op-amp 121 goes high and through diode 125 is applied to the R input of flip-flop 32, causing output 33 of flip-flop 32 to go low and motor 13 to be de-energized. The function of diode 126 and capacitor 128 is to provide a momentary disable function when switch 51 is activated to start brush motor 13. When brush motor 13 is off, the anode of diode 126 is at 12 volts as driven by output 34 of flip-flop 32 causing capacitor 128 to be discharged. When brush motor 13 is turned on, the anode voltage of diode 126 goes to 0 and hence diode 126 is effectively removed from the circuit. The voltage at the minus input of op-amp 121 is then initially 12 volts and decreases based on the time constant established by resistor 123 and capacitor 128. This is to disable this circuit during high in rush current associated with the start up of brush motor 13.

The function of the control circuit of the present invention for vacuum motor 14 is similar in many ways to the control circuit for brush motor 13 and will now be explained. When AC power is applied at DC power supply 16, the initially high output at 30 of NOR gate 24 is applied at the S input of flip-flop 44 and the R input is low so that Q will be high and Q bar will be low. When output 29 of NOR gate 24 goes low, then Q will remain high, Q-bar will be low, and the Q signal will drive led 45 to indicate that vacuum motor 14 is on. When switch 52 is depressed to stop vacuum motor 14, output 134 of op-amp 132 goes high and is applied to the clock input of flip-flop 44 causing Q output 46 to go low and Q-bar output 48 to go high. High output 48 causes the output of op-amp 38 to go high and drive led 49 through resistor 50 indicating that vacuum motor 14 is off.

When vacuum motor 14 is off and switch 52 is depressed to start vacuum motor 14, 12 volts DC is applied through a network of resistor 127, resistor 129, resistor 130, and capacitor 131 to the positive terminal of op-amp 132, which has a 6 volt DC signal connected to its negative terminal. Op-amp 132 has feedback resistor 133 connected between its output and its positive input so that with 12 volts present at the positive terminal, output 134 across resistor 136 will be 12 volts or high.

Output 134 is applied to the CLK input of flip-flop 44, causing Q to go high and Q-bar to go low. If vacuum motor 14 is not disabled by output 73 (vacuum disable) of one-shot 70 being high, then output 76 of NOR gate 74 will be high. Output 76 is applied through resistor 78 to base 80 of transistor 79 causing it to conduct and to pull in relay 66 which applies AC power to motor 14 causing it to start. Output 46 of flip-flop 44 is also applied to led 45 indicating motor 14 is running.

Output 76 of NOR gate 74 is also applied to one input of NOR gate 138 and the other input is low. Output 139 of NOR gate 138 is the inverse of output 76 of NOR gate 74. Output 139 serves a similar function for vacuum motor 14 as previously described for brush motor 13, e.g., to momentarily disable a circuit during start up. Output 139 is applied to the network of capacitor 140, diode 141, resistor 142 and resistor 143 and the functions are as described for brush motor 13.

The locked rotor cut out circuit condition for vacuum motor 13 is very similar to the second level overload circuit for brush motor 13 and can be explained as follows. A transformer is provided including primary 149 which carries the load current of vacuum motor 14, and including secondary 150 connected to load resistor 151. Output 155 which is proportional to or representative of the vacuum motor load current is applied to the positive input of op-amp 152 which has feedback resistor 153. Resistor 156 is connected between the negative input of op-amp 152 and ground. The gain of op-amp 152 may be programmed by introducing or not introducing resistor 154 by shorting at terminals 158 to provide for different AC voltage or different vacuum motors as previously explained for the brush motor 13.

Output 160 of amplifier 152 is applied to peak detection circuit 161 comprising diode 162, resistor 163 and capacitor 164 and providing a peak value output signal at 166. Output 166 is applied through resistor 168 to the positive terminal of op-amp 167 which has feedback resistor 169. Output 170 of op-amp 167 is applied to the reset input of flip-flop 44 causing Q-bar output 48 to go high and output 76 of NOR gate 74 to go low to de-energize vacuum motor 14 as previously explained.

The circuit of the the present invention thus momentarily disables vacuum motor 14 if an operator attempts to start both motors 13 and 14 at the same time. Further, when vacuum motor 14 is running and an operator activates switch 51 to start brush motor 13, vacuum motor 14 is de-energized for a period of time to allow brush motor 13 to start. Vacuum motor 14 is then started again after brush motor 13 has started. Further, the circuit of the present invention provides an indication to the operator when brush motor 13 is operating in a first level overload condition, giving the operator a period of time to adjust the operating load. Additionally, the circuit of the present invention de-energizes brush motor 13 if the first level overload condition exists for a continuous period of time, e.g., 25 seconds. Furthermore, the circuit of the present invention de-energizes brush motor 13 immediately when a second level overload condition occurs. Also, the circuit of the present invention de-energizes vacuum motor 14 immediately in the event of a locked rotor condition for brush motor 13.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. Circuit for controlling the operation of a first motor coupled to an agitating means and a second motor for creating air flow, said first motor having a first starting current value, a load current value and a load adjustment means, comprising, in combination:

first relay means for controlling the application of an electrical power source to said first motor; first switch means coupled to said first relay means; second relay means for controlling the application of said electrical power source to said second motor; second switch means coupled to said second relay means; means operatively coupled to said first switch means and to said second relay means for disabling said second motor when said first switch means is activated at a first time and to enable said second motor when a first period of time from said first time has elapsed; means for obtaining a first signal representative of said load current value; first means for comparing said first signal to a first reference current value; means for operating said first relay means to disconnect said power source from said first motor if a second period of time during which said load current value has continuously exceeded said first reference current value has elapsed; and means for operating said first relay means to disconnect said power source from said first motor if said load current value exceeds said second reference current value.

2. Circuit of claim 1 further comprising, in combination: means for restoring operation of said second motor after said first period of time has elapsed, if said second motor was operating at said first time.

3. Circuit of claim 2 further comprising, in combination: means for providing an overload indication to an operator when said load current exceeds said first reference current value to allow adjustment of said load adjustment means to reduce said load current value.

4. Circuit of claim 1 wherein said means for obtaining a first signal representative of said load current comprises, in combination:

a transformer having a primary and a secondary, said primary connected to said first motor, said secondary connected to a load means; and peak detection means coupled to said load means.

5. Circuit of claim 4 wherein said first means for comparing comprises, in combination:

a comparator having a positive input terminal, a negative input terminal and an output terminal; a reference voltage representative of said first reference current value connected to said negative input terminal; an output of said peak detection means connected to said positive input terminal; and said first comparator having a first output signal level when said load current value is less than said first reference current value and a second output signal level signal when said load current value is greater than said reference current value.

6. Circuit of claim 5 wherein said means for operating said first relay means comprises, in combination: timing means including a capacitor coupled to said output of said first comparator with said output signal at a second level initiating said timing means; and transistor means operatively coupled to an output of said timing means with said transistor means conducting to operate said first relay means to disconnect said first motor.

7. Circuit for controlling the operation of a first motor and a second motor, said first motor having a first starting current value, said second motor having a second starting current value, said second starting current value being less than said first starting current value, comprising, in combination:

first switch means operatively coupled to first relay means for energizing said first motor; second switch means operatively coupled to second relay means for energizing said second motor; means operatively coupled to said first switch means and to said second relay means for disabling said second motor when said first switch means is activated at a first time and for enabling said second motor when a first period of time from said first time has elapsed; and means for restoring operation of said second motor after said first period of time has elapsed, if said second motor was operating at said first time.

8. Circuit of claim 7 wherein said first motor has a load current value and said circuit further comprises, in combination: first means for comparing said load current value to a first reference current value; means for denergizing said first motor if said load current value has not been reduced to below said first reference current value during a second period of time; and means for denergizing said first motor if said load current value exceeds a second reference current value.

9. Circuit of claim 8 wherein said first motor has a load adjustment means and said circuit further comprises, in combination: means for providing an overload indication to an operator when said load current value exceeds said first reference current value to allow adjustment of said load adjustment means to reduce said load current value.

10. Circuit of claim 9 wherein said means for obtaining a first signal representative of said load current value comprises, in combination:

a transformer having a primary and a secondary, said primary connected to said first motor, said secondary connected to a load means; and peak detection means coupled to said load means.

11. Circuit of claim 10 wherein said first means for comparing comprises, in combination:

a comparator having a positive input terminal, a negative input terminal and an output terminal; a reference voltage representative of said first reference current value connected to said negative input terminal; an output of said peak detection means connected to said positive input terminal; and said first comparator having a first output signal level when said load current value is less than said first reference current value and a second output signal level signal when said load current value is greater than said reference current value.

12. Circuit for controlling the operation of a first motor coupled to an agitating means, said first motor having a load adjustment means, a starting current value, and a load current value, comprising, in combination:

first relay means for controlling the application of an electrical power source to said first motor; first switch means coupled to said first relay means; means for obtaining a first signal representative of said load current value; first means for comparing said first signal to a first reference current value; means for operating said first relay means to disconnect said power source from said first motor if a first period of time during which said load current value has continuously exceeded said first reference current value has elapsed; means for operating said first relay means to disconnect said power source from said first motor if said load current value exceeds a second reference current value; and means for providing an overload indication to an operator when said load current exceeds said first reference current value to allow adjustment of said load adjustment means to reduce said load current value within the first period of time.

13. Circuit of claim 12 wherein said circuit controls a second motor for use in creating an air flow, said second motor having a starting current value less that said first motor starting current value, further comprising, in combination: said first switch means coupled to a second relay means to disable said second motor when said first switch means is activated at a first time and to enable said second motor when a second period of time from said first time has elapsed; and means for restoring operation of said second motor after said first period of time has elapsed, if said second motor was operating at said first time.

14. Circuit of claim 13 wherein said means for obtaining a first signal representative of said load current comprises, in combination:

a transformer having a primary and a secondary, said primary connected to said first motor, said secondary connected to a load means; and peak detection means coupled to said load means.

15. Circuit of claim 14 wherein said first means for comparing comprises, in combination:

a comparator having a positive input terminal, a negative input terminal and an output terminal; a reference voltage representative of said first reference current value connected to said negative input terminal; an output of said peak detection means connected to said positive input terminal; and said comparator having a first output signal level when said load current value is less than said first reference current value and a second output signal level signal when said load current value is greater than said first current value.

16. Circuit of claim 15, further comprising, in combination: means for comparing a load current value of said second motor to a third reference current value; and means for de-energizing said second motor if said load current of said second motor exceeds said third reference current value.

17. Circuit of claim 16 wherein said first motor is an induction motor having a starting winding and said second motor is a universal motor.

18. A method of operating a first motor coupled to an agitating means and a second motor for creating air flow, said first motor having a first starting current value, a load current value and a load adjustment means, said second motor having a second starting current value, said second starting current value being less than said first starting current value, comprising the following steps:

disabling operation of said second motor during a first motor start up period;

restoring operation of said second motor if said second motor was operating prior to said first motor start up obtaining a first signal representative of said first motor load current value;

comparing said first signal to a first level overload reference signal and to a second level overload reference signal;

timing a duration of a first level overload condition;

disabling operation of said second motor if said duration exceeds a first period of time; and disabling operation of said first motor if said first signal exceeds a second level overload reference signal.

19. A method of operating a motor coupled to an agitating means, said motor having a load current value, comprising the following steps:

obtaining a first signal representative of said motor load current value;

comparing said first signal to a first level overload reference signal and to a second level overload reference signal;

timing a duration of a first level overload condition;

disabling operation of said motor if said duration exceeds a first period of time; and disabling operation of said motor if said first signal exceeds the second level overload reference signal, wherein said motor has a load adjustment means and said step of comparing said first signal to a first level overload reference signal and to a second level overload reference signal includes providing an overload indication to an operator when said load current value exceeds said first reference current value to allow adjustment of said lead adjustment means to reduce said load current value.

20. A method of operating a tint motor coupled to an agitating means, and a second motor for use in creating an air flow, said first motor having a starting current value greater than a starting current value of said second motor, comprising the following steps:

operating said second motor while the first motor is not operating;

disabling operation of said second motor during a first motor start up period;

starting said first motor during the first motor start up period; and restoring operation of said second motor after the first motor start up period and while the first motor is operating.

\* \* \* \* \*

UNITED STATES PATENT AND TRADEMARK OFFICE
CERTIFICATE OF CORRECTION

PATENT NO. : 5,698,957
DATED : December 16, 1997
INVENTOR(S) : Mark J. Sowada It is certified that error appears in the above-identified patent and that said Letters Patent is hereby corrected as shown below:

Column 10, line 12, cancel "lead" and substitute therefor --load--.

Column 10, line 14, cancel "tint" and substitute therefor --first--.

Signed and Sealed this

Third Day of March, 1998

Attest:

BRUCE LEHMAN

*Attesting Officer*    *Commissioner of Patents and Trademarks*